US011644106B2

(12) United States Patent
Williams et al.

(10) Patent No.: US 11,644,106 B2
(45) Date of Patent: May 9, 2023

(54) HIGH-TEMPERATURE LOW-FRICTION COBALT-FREE COATING SYSTEM FOR GATE VALVES, BALL VALVES, STEMS, AND SEATS

(71) Applicant: OERLIKON METCO (US) INC., Westbury, NY (US)

(72) Inventors: Kevin Williams, Houston, TX (US); James Vecchio, San Diego, CA (US); Jonathon Bracci, Escondido, CA (US); Justin Cheney, Encinitas, CA (US); Petr Fiala, Fort Saskatchewan (CA)

(73) Assignee: OERLIKON METCO (US) INC., Westbury, NY (US)

( * ) Notice: Subject to any disclaimer, the term of this patent is extended or adjusted under 35 U.S.C. 154(b) by 23 days.

(21) Appl. No.: 17/298,383

(22) PCT Filed: Dec. 18, 2019

(86) PCT No.: PCT/US2019/067209
§ 371 (c)(1),
(2) Date: May 28, 2021

(87) PCT Pub. No.: WO2020/132085
PCT Pub. Date: Jun. 25, 2020

(65) Prior Publication Data
US 2022/0120349 A1    Apr. 21, 2022

Related U.S. Application Data

(60) Provisional application No. 62/781,960, filed on Dec. 19, 2018.

(51) Int. Cl.
*F16K 3/02* (2006.01)
*C23C 4/126* (2016.01)
(Continued)

(52) U.S. Cl.
CPC .......... *F16K 3/0263* (2013.01); *C22C 19/055* (2013.01); *C22C 19/056* (2013.01);
(Continued)

(58) Field of Classification Search
CPC ........................... F16K 3/0263; F16K 25/005
See application file for complete search history.

(56) References Cited

U.S. PATENT DOCUMENTS

| 3,369,891 A | 2/1968 | Tarkan et al. |
| 8,146,889 B2 | 4/2012 | Hunter |

(Continued)

FOREIGN PATENT DOCUMENTS

| CN | 1735699 A | 2/2006 |
| CN | 205423882 U | 8/2016 |

(Continued)

OTHER PUBLICATIONS

Taylor Special Steels: http://www.taylorspecialsteels.co.uk/pages/main/conchart.htm (Year: 2022).*

(Continued)

*Primary Examiner* — Michael R Reid
(74) *Attorney, Agent, or Firm* — Greenblum & Bernstein, P.L.C.

(57) ABSTRACT

A method of manufacturing a device includes thermally spraying tungsten carbine in feedstock that does not include Cobalt but that includes Nickel, Copper, or a Nickel-Copper alloy, the method improves the base coating toughness, anticorrosion, and antifouling properties for high load application in sea water and brackish water environments. Additionally, a Cobalt-free material lowers material costs and reduces the global demand of Cobalt. Providing a topcoat of a Silicon-doped DLC significantly reduces the topcoat brittleness of common DLC failures such as "egg shell" in (Continued)

high stress applications. Thus, high hardness, low friction applications may be tailored in high stress applications.

25 Claims, 7 Drawing Sheets

(51) Int. Cl.
  C22C 19/05  (2006.01)
  C22C 29/08  (2006.01)
  C23C 4/10   (2016.01)
  C23C 4/18   (2006.01)
  F16K 3/36   (2006.01)
  C23C 28/04  (2006.01)
  F16K 25/00  (2006.01)

(52) U.S. Cl.
  CPC .............. *C22C 29/08* (2013.01); *C23C 4/10* (2013.01); *C23C 4/126* (2016.01); *C23C 4/18* (2013.01); *C23C 28/042* (2013.01); *C23C 28/044* (2013.01); *C23C 28/046* (2013.01); *F16K 3/36* (2013.01); *F16K 25/005* (2013.01)

(56) References Cited

U.S. PATENT DOCUMENTS

| | | | |
|---|---|---|---|
| 2002/0032073 | A1 | 3/2002 | Rogers et al. |
| 2003/0132415 | A1 | 7/2003 | Chigasaki et al. |
| 2004/0118455 | A1 | 6/2004 | Welty et al. |
| 2006/0018780 | A1 | 1/2006 | Hosamani et al. |
| 2007/0163655 | A1 | 7/2007 | Hunter et al. |
| 2010/0112374 | A1 | 5/2010 | Khauf |
| 2010/0136368 | A1 | 6/2010 | Kiser et al. |
| 2012/0261603 | A1* | 10/2012 | Kahn .................. F16K 3/0236 251/328 |
| 2014/0248509 | A1 | 9/2014 | Cheney et al. |
| 2015/0053281 | A1 | 2/2015 | Haldorsen et al. |
| 2015/0353856 | A1 | 12/2015 | Kleyman et al. |
| 2018/0274076 | A1 | 9/2018 | Kleyman et al. |
| 2020/0248819 | A1 | 8/2020 | Stadlberger et al. |

FOREIGN PATENT DOCUMENTS

| | | |
|---|---|---|
| CN | 106795631 A | 5/2017 |
| DE | 10 2009 043097 A1 | 3/2011 |
| GB | 2 039 950 A | 8/1980 |
| RU | 2623545 C2 | 6/2017 |
| WO | 2007/022514 | 2/2007 |
| WO | 2013/101544 | 7/2013 |
| WO | 2013/129939 | 9/2013 |
| WO | 2019/025627 | 2/2019 |

OTHER PUBLICATIONS

Office Action issued in corresponding Russian App. No. 2021116158, dated Feb. 21, 2022, along with English translation.
Russian Search Report issued in corresponding Russian App. No. 2021116158, dated Feb. 14, 2022, along with English translation.
Int'l Search Report (Form PCT/ISA/210) conducted in Int'l Appln. No. PCT/US2019/067209 (dated Mar. 31, 2020).
Int'l Written Opinion (Form PCT/ISA/237) conducted in Int'l Appln. No. PCT/US2019/067209 (dated Mar. 31, 2020).
gordonengland.co.uk "Rockwell and Vickers hardness comparison Chart," (Jul. 14, 2018) https://web.archive.org/web/20180714215220/ https://www.gordonengland.co.uk/hardness/rockwell_conversion_chart.htm.
Office Action with Search Report issued in corresponding CN Patent App. No. 201980080516.2, dated Nov. 3, 2022, translation.
Extended European Search Report issued in EP Patent Application No. 19898601.0, dated Jan. 10, 2023.
Bolelli G. et al., "HVOF-sprayed WC-Co as hard interlayer for DLC films", Surface and Coatings Technology, Elsevier, NL, Dec. 25, 2008, XP025656902A.

* cited by examiner

- 101 – Volume fraction of all hard phases at 1500K is greater than 5%
- 102 – The hypereutectic hard phases make up more than 50% of the total hard phases in the alloy
- 103 – The matrix proximity of the alloy is greater than 60% when compared to Inconel 625

- 301 - Volume fraction of all hard phases at 1200K is greater than 5%
- 302 – The hypereutectic hard phases make up more than 50% of the total hard phases in the alloy
- 303 - The matrix proximity of the alloy is greater than 60% when compared to Inconel 625

HIGH-TEMPERATURE LOW-FRICTION COBALT-FREE COATING SYSTEM FOR GATE VALVES, BALL VALVES, STEMS, AND SEATS

PRIORITY TO RELATED APPLICATION

This application is a U.S. National Stage of International Application No. PCT/US2019/067209 filed Dec. 18, 2019 and claims priority to U.S. Provisional Application No. 62/781,960, filed on Dec. 19, 2018, the disclosures of which being incorporated herein by reference in their entireties.

BACKGROUND

1. Field of the Disclosure

Embodiments of this disclosure generally relate to Cobalt-free alloys that may serve as effective feedstock for hardfacing processes, such as for load-bearing surfaces. Specifically, embodiments of this disclosure relate to Cobalt-free alloys that may serve as effective feedstock for coating load-bearing surfaces in gate valves, ball valves, stems, and seats.

2. Related Art

Abrasive and erosive wear is a major concern for operators in applications that involve media wearing away against a surface. Applications which see severe wear typically utilize materials of high hardness to resist material failure due to the risk of wear. Materials used to protect components form wear due to pressure applied by opposing surfaces may include Carbides and/or Borides as hard precipitates, which resist abrasion and increase the bulk hardness of the material. These materials are often applied as a coating, known as hardfacing, through various welding processes, or cast directly into a part. For example, Tungsten Carbide with a Cobalt matrix may be applied by thermal spray, followed by a diamond like coating (DLC) topcoat applied by chemical vapor deposition (CVD).

Another concern for operators is corrosion. Applications that see severe corrosion typically utilize soft Nickel based or stainless steel type materials with high Chromium content. In these types of applications, no cracks may be present in the overlay as cracks may result in corrosion of the underlying base material.

SUMMARY

Example embodiments of the current disclosure include Tungsten Carbide, or other Carbides, in some embodiments, in a Cobalt-free matrix such, e.g., a Nickel matrix, a Copper matrix, or a Nickel-Copper matrix. Such matrices, when used to form a base coat, improve the corrosion resistance and antifouling properties of the base coat. Such Cobalt-free materials have lower material costs than Cobalt, and reduce sourcing concerns due at least in part to the fact that a large portion of the world's Cobalt supply comes from conflict regions.

Accordingly, there is a need for a replacement of the Cobalt matrix with another matrix that does not present the cost and environmental concerns drawbacks of Cobalt matrices. In example embodiments, Nickel, Copper, or Nickel-Copper alloys improves the corrosion resistance and antifouling properties of the base coat.

It is common to use either a wear-resistant material, or a corrosion-resistant material, as there are few alloys that satisfy both requirements. However, existing materials may not provide the necessary useful life, or may require the addition of Carbides to provide an increase in wear resistance, which may cause cracking.

Polymer coatings have been used on sliding load-bearing surfaces in general, including on ball valves. Some polymer-type coatings have been used on gate valves as well, but generally suffer from insufficient load-bearing capacity and ductility, especially at elevated temperatures. A thermoplastic polymer coating tends to creep, or permanently deform, under high contact stress and elevated temperatures. A thermoset type of polymer coating does not soften with temperature as does a thermoplastic, but generally suffers from poor ductility and a propensity toward greater adhesion especially at elevated temperatures. These properties generally result in cracks in the coating and the removal of the coating to its mated surface.

Plasma assisted CVD (PA-CVD) of a topcoat using a Silicon dopant reduces the internal stresses of the topcoat while maintaining typical hardness and low friction properties.

Gate valves are used when a straight-line flow of fluid and minimum flow restriction are required. When the valve is wide open, the gate is drawn into the opposite end of the valve cavity. The gate has an opening for flow through the valve the same size as the pipe in which the valve is installed. The valve provides an unobstructed passageway that when fully open is best suited for main fluid supply lines and for pump lines, and is often used for oil and gas production where pressures may range from 5000 psi to 30,000 psi. Gate valves may feature a coating on the exterior surface of the valve's gate and seats to reducing friction, as well as to reduce corrosion and improve wear resistance. Some previous versions have utilized layers of hard facing, such as Tungsten Carbide, upon the surface of the valve's gate and seats. Other previous versions have utilized a vapor deposition process or a chemical vapor deposition to coat the exterior surface of the valve's gate and seats.

Corrosion- and wear-resistant coatings can be prepared based on a feedstock material, wherein the feedstock material is configured to form a matrix that has specific physicochemical properties under thermodynamic equilibrium conditions.

Example embodiments include an apparatus for controlling well fluids, the apparatus including a gate valve having a body, the body having a cavity and a flow passage intersecting the cavity; a seat ring mounted to the body at the intersection of the flow passage and the cavity, the seat ring having an engaging face formed of a steel alloy; a gate in the cavity and having an engaging face formed of a steel alloy that slidingly engages the face of the seat ring while being moved between open and closed positions; a hardened outer layer formed the engaging face of the seat ring, the hardened layer comprising Tungsten Carbide in a Cobalt-free matrix; and a friction-resistant coating of diamond-like carbon on the hardened outer layer; wherein the hardened outer layer is formed of a Cobalt-free feedstock material.

Example embodiments include a method of manufacturing a valve, the method including thermally spraying tungsten carbide in a Cobalt matrix to a selected load-bearing surface of a component of the valve to produce a hardened layer on the load-bearing surface; applying a low friction coating of diamond-like carbon layer to the hardened layer; and assembling the component in the valve with the diamond-like carbon layer in sliding engagement with an engaging surface of the valve; wherein the load-bearing surface comprises an engaging face of a seat ring of the valve and the engaging surface comprises a face of a gate of the valve that is moved linearly across the engaging face on the seat ring.

Example embodiments include a method of manufacturing a valve, the method including thermally spraying tungsten carbide in a Cobalt-free matrix to a surface of a valve component to deposit a hardened layer; applying a diamond-like carbon layer to the hardened layer on the surface of the valve component using a vapor deposition process; and assembling the valve component in the valve with the diamond-like carbon layer in sliding engagement with a steel alloy surface of the valve; wherein the valve component comprises a seat ring and the steel alloy surface comprises an engaging face of a gate that is moved linearly across the diamond-like carbon layer on the seat ring. In example embodiments, the thermally spraying comprises thermally spraying tungsten carbide in a matrix that includes at least one of Nickel and Copper.

Disclosed herein are embodiments of a feedstock material including, in wt. %, Ni and C: 0.5-2, Cr: 10-30, Mo: 5.81-18.2, Nb+Ti: 2.38-10, Ni: Balance.

In example embodiments, the feedstock material may further include, in wt. %, C: 0.8-1.6, Cr: 14-26, and Mo: 8-16. In example embodiments, the feedstock material may further include, in wt. %, C: 0.84-1.56, Cr: 14-26, Mo: 8.4-15.6, and Nb+Ti: 4.2-8.5. In example embodiments, the feedstock material may further include, in wt. %, C: 8.4-1.56, Cr: 14-26, Mo: 8.4-15.6, Nb: 4.2-7.8, and Ti: 0.35-0.65. In example embodiments, the feedstock material may further include, in wt. %, C: 1.08-1.32, Cr: 13-22, Mo: 10.8-13.2, and Nb: 5.4-6.6. In other example embodiments, the feedstock material may further include, in wt. %, C: 1.2, Cr: 20, Mo: 12, Nb: 6, and Ti: 0.5, Ni: Balance.

In example embodiments, the feedstock material is a powder. In further example embodiments, the feedstock material is a wire. In other example embodiments, the feedstock material is a combination of a wire and a powder. In further example embodiments, the feedstock material may be or include other forms of material suitable to be thermal-sprayed, such as, e.g., made via an agglomerated and sintered process. Also disclosed herein are embodiments of a hardfacing layer formed from the feedstock material as disclosed herein.

In example embodiments, the hardfacing layer may include a Nickel matrix including hard phases of 1,000 Vickers hardness or greater totaling 5 mol. % or greater of Nickel, 20 wt. % or greater of a combined total of Chromium and Molybdenum, isolated hypereutectic hard phases totaling to 50 mol. % or more of a total hard phase fraction, a $WC/Cr_3C_2$ ratio of 0.33 to 3, an ASTM G65A abrasion loss of less than 250 $mm^3$, and a Vickers hardness of 650 or greater. In other example embodiments, the hardfacing layer may have a Vickers hardness of 750 or greater. In further example embodiments, the hardfacing layer may exhibit two cracks or fewer per square inch, have an adhesion of 9,000 psi or greater, and have a porosity of 2 volume % or less. In other example embodiments, the hardfacing layer may have a porosity of 0.5 volume % or less. In further embodiments, the hardfacing layer may have a corrosion rate of 1 mpy or less in an about 28% $CaCl_2$ electrolyte, pH=9.5 environment. In other example embodiments, the hardfacing layer may have a corrosion rate of 0.4 mpy or less in an about 28% $CaCl_2$ electrolyte, pH=9.5 environment. In further example embodiments, the hardfacing layer may have a corrosion rate of below 0.1 mpy in a 3.5% sodium chloride solution for 16 hours according to G-59/G-61. In still further example embodiments, the hardfacing layer may have a corrosion rate of below 0.08 mpy in a 3.5% sodium chloride solution for 16 hours according to G-59/G-61.

In example embodiments, the Nickel matrix may have a matrix proximity of 80% or greater as compared to a corrosion-resistant alloy defined by Ni: BAL, X>20 wt. %, wherein X represents at least one of Cu, Cr, or Mo. In example embodiments, the corrosion-resistant alloy is selected from the group consisting of Inconel 625, Inconel 622, Hastelloy C276, Hastelloy X, and Monel 400, where Monel is a Nickel-Copper alloy with high tensile strength and resistance to corrosion.

In example embodiments, the hardfacing layer may be applied onto a hydraulic cylinder, tension riser, mud motor rotor, or oilfield component application.

Further disclosed herein are example embodiments of a feedstock material including Nickel, wherein the feedstock material is configured to form a corrosion-resistant matrix which is characterized by having, under thermodynamic equilibrium conditions hard phases of 1,000 Vickers hardness or greater totaling 5 mol. % or greater, and a matrix proximity of 80% or greater when compared to a known corrosion-resistant Nickel alloy.

In example embodiments, the known corrosion-resistant Nickel alloy may be represented by the formula Ni: BAL X>20 wt. %, wherein X represents at least one of Cu, Cr, or Mo.

In example embodiments, the corrosion-resistant matrix may be a Nickel matrix including 20 wt. % or greater of a combined total of Chromium and Molybdenum. In example embodiments, under thermodynamic equilibrium conditions, the corrosion-resistant matrix may be characterized by having isolated hypereutectic hard phases totaling to 50 mol. % or more of a total hard phase fraction.

In example embodiments, the known corrosion-resistant Nickel alloy may be selected from the group consisting of Inconel 625, Inconel 622, Hastelloy C276, Hastelloy X, and Monel 400.

In example embodiments, the feedstock material may include, in wt %, C: 0.84-1.56, Cr: 14-26, Mo: 8.4-15.6, Nb: 4.2-7.8, and Ti: 0.35-0.65, Ni: Balance. In example embodiments, the feedstock material may further include B: 2.5 to 5.7, and Cu: 9.8 to 23. In example embodiments, the feedstock material may further include Cr: 7 to 14.5.

In example embodiments, under thermodynamic equilibrium conditions, the corrosion-resistant matrix may be characterized by having hard phases totaling 50 mol. % or greater, and a liquidus temperature of 1550 K or lower.

In example embodiments, the feedstock material may include a blend of Monel and at least one of WC or $Cr_3C_2$.

In example embodiments, the feedstock material is selected from the group consisting of, by wt., 75-85% WC+15-25% Monel, 65-75% WC+25-35% Monel, 60-75% WC+25-40% Monel, 75-85% $Cr_3C_2$+15-25% Monel, 65-75% $Cr_3C_2$+25-35% Monel, 60-75% $Cr_3C_2$+25-40% Monel, 75-85% $WC/Cr_3C_2$+15-25% Monel, 65-75% $WC/Cr_3C_2$+25-35% Monel, and 60-75% $WC/Cr_3C_2$+25-40% Monel. In example embodiments, a $WC/Cr_3C_2$ ratio of the corrosion-resistant matrix may be 0.2 to 5 by volume.

In example embodiments, the hardfacing layer may include an ASTM G65A abrasion loss of less than 250 $mm^3$, and two cracks or fewer per square inch when forming the hardfacing layer from a plasma transferred arc (PTA) or laser cladding process. In example embodiments, the hardfacing layer may include an impermeable High Velocity Oxygen Fuel (HVOF) coating which exhibits a corrosion rate of 1 mpy or less in an about 28% $CaCl_2$ electrolyte, pH=9.5 environment.

In example embodiments, the hardfacing layer may further include a Vickers hardness of 650 or greater, and an adhesion of 9,000 psi or greater when forming the hardfacing layer from a HVOF thermal spray process.

In example embodiments, the hardfacing layer may include a Vickers hardness of 750 or greater, and a porosity of 2 volume % or less, preferably 0.5% or less when forming the hardfacing layer from a HVOF thermal spray process.

In an embodiment, the hardfacing layer is formed from the feedstock material.

In an embodiment the feedstock material is a Cobalt-free feedstock material.

In an embodiment the Cobalt-free feedstock material comprises, in wt. %: Ni: Balance; C: about 0.8-about 1.6; Cr: about 14-about 26; and Mo: about 8-about 16.

In an embodiment the Cobalt-free feedstock material comprises, in wt. %: Ni: Balance; C: about 0.84-about 1.56; Cr: about 14-about 26; Mo: about 8.4-about 15.6; and Nb+Ti: about 4.2-about 8.5.

In an embodiment the Cobalt-free feedstock material comprises, in wt. %: Ni: Balance; C: about 1.2; Cr: about 20; Mo: about 12; Nb: about 6; and Ti: about 0.5.

In an embodiment, the Cobalt-free feedstock material is a powder.

In an embodiment, the Cobalt-free feedstock material is a wire.

In an embodiment, the Cobalt-free feedstock material is a combination of a wire and a powder.

In an embodiment, the feedstock material comprises Nickel; wherein the feedstock material is configured to form a corrosion-resistant matrix which is characterized by having, under thermodynamic equilibrium conditions: hard phases of 1,000 Vickers hardness or greater totaling 5 mol. % or greater; and a matrix proximity of 80% or greater when compared to a known corrosion-resistant Nickel alloy.

In an embodiment, the known corrosion-resistant Nickel alloy is represented by the formula Ni: BAL X>20 wt. %, wherein X represents at least one of Cu, Cr, or Mo.

In an embodiment, the Cobalt-free feedstock material is a powder.

In an embodiment, the powder is made via an atomization process.

In an embodiment, the powder is made via an agglomerated and sintered process.

In an embodiment, the corrosion-resistant matrix is a Nickel matrix comprising 20 wt. % or greater of a combined total of Chromium and Molybdenum.

In an embodiment, under thermodynamic equilibrium conditions, the corrosion-resistant matrix is characterized by having isolated hypereutectic hard phases totaling to 50 mol. % or more of a total hard phase fraction.

In an embodiment, the known corrosion-resistant Nickel comprises Monel 400.

In an embodiment, the Cobalt-free feedstock material comprises: Ni: Balance; C: 0.84-1.56; Cr: 14-26; Mo: 8.4-15.6; Nb: 4.2-7.8; and Ti: 0.35-0.65.

In an embodiment, the Cobalt-free feedstock material further comprises: Ni: Balance; B: about 2.5 to about 5.7; and Cu: about 9.8 to about 23.

In an embodiment, the Cobalt-free feedstock material further comprises: Cr: about 7 to about 14.5.

In an embodiment, the thermal spray feedstock material comprises a wire.

In an embodiment, the thermal spray feedstock material comprises a combination of a wire and powder.

In an embodiment, the invention comprises a method of reducing a topcoat brittleness by coating a silicon-doped diamond like coating, wherein the topcoat is hard and exhibits low friction.

In an embodiment, the device is a valve, and the portion of the device is a gate.

In an embodiment, the invention comprises a method of manufacturing a valve, the method comprising: thermally spraying tungsten carbide in a Cobalt-free feedstock to a surface of a valve component to deposit a hardened layer; applying a diamond-like carbon layer to the hardened layer on the surface of the valve component using a vapor deposition process; and assembling the valve component in the valve with the diamond-like carbon layer in sliding engagement with a steel alloy surface of the valve; wherein the valve component comprises a seat ring and the steel alloy surface comprises an engaging face of a gate that is moved linearly across the diamond-like carbon layer on the seat ring.

In an embodiment, the thermally spraying comprises thermally spraying tungsten carbide in feedstock that includes at least one of Nickel and Copper.

BRIEF DESCRIPTION OF THE DRAWINGS

The present disclosure is further described in the detailed description which follows, in reference to the noted plurality of drawings, by way of examples embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

Embodiments of the present disclosure include but are not limited to hardfacing/hardbanding materials, alloys or powder compositions used to make such hardfacing/hardbanding materials, methods of forming the hardfacing/hardbanding materials, and the components or substrates incorporating or protected by these hardfacing/hardbanding materials.

Figure 1:
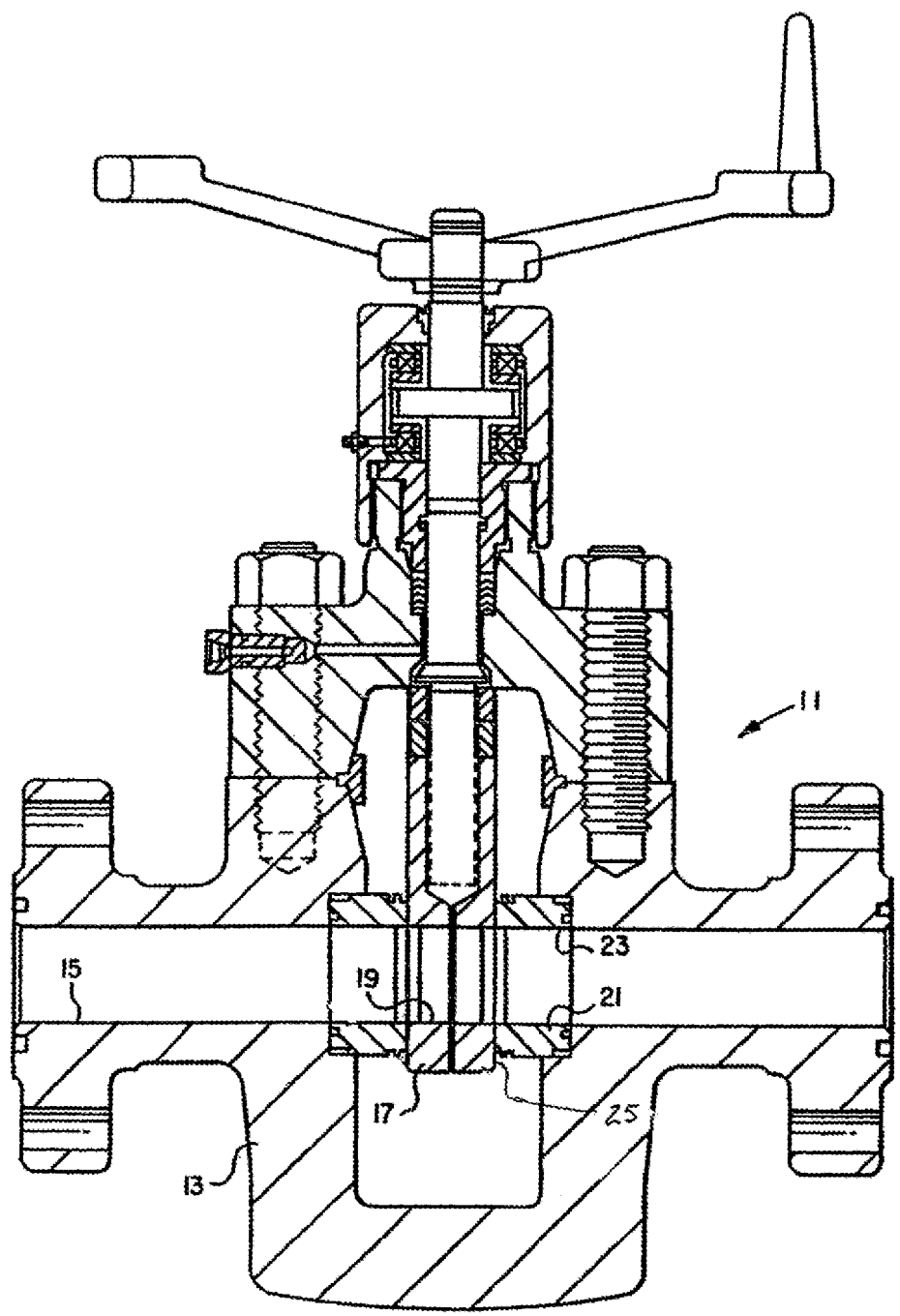
FIG. 1 is a cross-sectional view of a gate valve having a coating on at least one of the interfaces between the gate and seats, in accordance with example embodiments.

FIG. 1 is a cross-sectional view of a gate valve having a coating on at least one of the interfaces between the gate and seats, in accordance with example embodiments. In FIG. 1, the gate valve 11 has a body 13 and a flow passage 15 that extends transversely through the body 13. The valve 11 also has a gate 17 with a hole 19 therethrough. The gate 17 is shown in FIG. 1 in the open position. The gate valve 11 illustrated in FIG. 1 is a non-rising-stem type valve, but may alternatively be a rising-stem type valve. Also shown in FIG. 1 are ring-shaped valve seats 21, which have holes 23 that register with the flow passage 15 of the valve. The gate valve 11 is shown as a split gate type having two separate slabs, but the gate valve 11 may alternatively be a single slab type.

When the gate 17 is in the open position, the hole 19 of the gate 17 registers with the flow passage 15 of the valve 11, thereby allowing flow through the valve. When the gate is closed, the hole 19 no longer registers with the flow passage 15. The gate 17 has an engaging face 25 on each side that interfaces with the seats 21. When the gate 17 is closed, pressure in the flow passages 15 creates a substantial load on one of the faces 25 that is against one of the seats 21. Movement of the gate 17 to, or from, the closed position causes one of the faces 25 to slide against one of the seats 21 while exerting contact forces, if one of flow passages 15 is under high pressure. The gate valve 11 shown in FIG. 1 is a forward acting gate valve, which means that the gate 17 moves down to close the gate valve 11. Alternatively, the gate valve 11 may be a reverse acting gate valve by repositioning the location of the gate opening.

The gate valve slab or gate 17 may be made from corrosion-resistant steel alloys such as one of the following: high quality low alloy steel; stainless steel; Nickel-Copper alloy steel; and Monel alloys. Seats 21 may be formed of the same types of material.

Example embodiments of a method of applying a topcoat to the surface of the faces 25, and/or of the seats 21, include a Plasma Assisted (PA) CVD process using a Silicon dopant to reduce the internal stresses of the topcoat while maintaining typical hardness and low friction properties. This reduces incident of cracking in the topcoat from mechanical and thermal stresses.

In example embodiments, Nickel- and/or Copper-based alloys as described herein may serve as effective feedstock for PTA processes, laser cladding hardfacing processes including high speed laser cladding, and/or thermal spray processing including HVOF thermal spray, though the disclosure is not so limited. Example embodiments include the manufacture of Nickel- and/or Copper-based alloys into cored wires for hardfacing processes, and the welding methods of Nickel- and/or Copper-based wires and powders using wire fed laser and short wave lasers.

The term alloy may encompass the chemical composition of a powder used to form a metal component and the powder itself. The term alloy may also encompass the chemical composition of a melt used to form a casting component and the melt itself. The term alloy may encompass the composition of the metal component formed by the heating, sintering, and/or deposition of the powder. The term alloy may also encompass the composition of the metal component after cooling. In example embodiments, the term alloy may encompass the chemical composition forming the powder disclosed within and the powder itself. The term alloy may encompass the feedstock used to form the metal component. The term alloy may encompass the wire, the wire including a powder, the combined composition of a combination of wires, the composition of the metal component formed by the heating and/or deposition of the powder, or other methodology, and the metal component.

In example embodiments, alloys manufactured into a solid or cored wire (a sheath containing a powder) for welding or for use as a feedstock for another process may be described by specific chemical processes herein. For example, the wires may be used for a thermal spray. Further, the compositions disclosed below may be from a single wire or a combination of multiple wires (such as 2, 3, 4, or 5 wires).

In example embodiments, the alloys may be applied by a thermal spray process to form a thermal spray coating, such as HVOF alloys. In other example embodiments, the alloys may be applied as a weld overlay. In further example embodiments, the alloys may be applied either as a thermal spray or as a weld overlay, e.g., having dual use.

Replacement of the Cobalt matrix for Tungsten Carbides with Nickel, Copper, or Nickel-Copper alloys may be performed via a modified sintering process to produce high quality thermal spray powders. Additionally, Rapid Alloy Development software may be utilized to tailor the matrix formula to specific coating requirements. Still further, doping of the DLC topcoat with Silicon significantly reduces internal stresses of the topcoat. In most high stress applications, the high internal stresses of the DLC lead to topcoat fracture and reduced performance.

Example embodiments include a method to produce steel and Nickel, Copper, or Nickel-Copper alloy valve load-bearing components such as gates, balls, seats, and valve body stems with a thermal sprayed Tungsten Carbide with either Nickel, Copper, or Nickel-Copper alloy matrix base coating in a thickness range of 0.005 inches up to 0.025 inches. A subsequent topcoat material of Silicon-doped DLC. A non-limiting thickness of the DLC is a thicknesses up to 30 micron ($10^{-6}$ meters) to create a high temperature monolithic, lower stress coating to reduce sliding friction, and improve anti corrosion and antifouling in seawater and or brackish water environments.

Metal Alloy Compositions:

In example embodiments, an article of manufacture, such as a composition of a feedstock as disclosed herein, may include Ni and in weight percent (wt %): B: 0-4; C: 0-9.1; Cr: 0-60.9; Cu: 0-31; Fe: 0-4.14; Mn: 0-1.08; Mo: 0-10.5; Nb: 0-27; Si: 0-1; Ti: 0-24; and W: 0-12.

In example embodiments, an article of manufacture, such as a composition of a feedstock as disclosed herein, may include Ni and in weight percent (wt %): C: 0.5-2; Cr: 10-30; Mo: 5-20; and Nb+Ti: 2-10.

In example embodiments, an article of manufacture, such as a composition of a feedstock as disclosed herein, may include Ni and in weight percent (wt %): C: 0.8-1.6; Cr: 14-26; Mo: 8-16; and Nb+Ti: 2-10.

In example embodiments, an article of manufacture, such as a composition of a feedstock as disclosed herein, may include Ni and in weight percent (wt %): C: 0.84-1.56; Cr: 14-26; Mo: 8.4-15.6; and Nb+Ti: 4.2-8.5.

In example embodiments, an article of manufacture, such as a composition of a feedstock as disclosed herein, may include Ni and in weight percent (wt %): C: 0.84-1.56; Cr: 14-26; Mo: 8.4-15.6; Nb: 4.2-7.8; and Ti: 0.35-0.65.

In example embodiments, an article of manufacture, such as a composition of a feedstock as disclosed herein, may include Ni and in weight percent (wt %): C: 1.08-1.32; Cr: 18-22; Mo: 10.8-13.2; and Nb: 5.4-6.6.

In example embodiments, an article of manufacture, such as a composition of a feedstock as disclosed herein, may include Ni and in weight percent (wt %): C: 0.5-2; Cr: 10-30; Mo: 5.81-18.2; and Nb+Ti: 2.38-10.

In example embodiments, an article of manufacture, such as a composition of a feedstock as disclosed herein, may include one of the following, in weight percent (wt %): C: 0.5, Cr: 24.8, Mo: 9.8, Ni: BAL; C: 0.35-0.65, Cr: 17.3-32.3, Mo: 6.8-12.7, Ni: BAL; C: 0.45-0.55, Cr: 22.3-27.3, Mo: 8.8-10.8, Ni: BAL; C: about 0.8, Cr: about 25, Mo: about 14, Ni: BAL; C: 0.56-1.04, Cr: 17.5-32.5, Mo: 9.8-18.2, Ni: BAL; C: 0.7-0.9, Cr: 22.5-27.5, Mo: 12.6-15.4, Ni: BAL; C: about 1.2, Mo: about 24, Mo: about 14, Ni: BAL; C: 0.84-1.56, Cr: 16.8-31.2, Mo: 9.8-18.2, Ni: BAL; C: 1.08-1.32, Cr: 21.6-26.4, Mo: 12.6-15.4, Ni: BAL; C: about 1.2, Cr: about 20, Mo: about 12, Nb: about 6, Ti: about 0.5, Ni: BAL; C: 0.84-1.56, Cr: 14-26, Mo: 8.4-15.6, Nb: 4.2-7.8, Ti: 0.35-0.65, Ni: BAL; C: 1.08-1.32, Cr: 18-22, Mo: 10.8-13.2, Nb: 5.4-6.6, Ti: 0.45-0.55, Ni: BAL; C: about 1.6, Cr: about 18, Mo: about 14, Nb: about 6, Ni: BAL; C: 1.12-2.08, Cr: 12.6-23.4, Mo: 9.8-18.2, Nb: 4.2-7.8, Ni: BAL; C: 1.44-1.76, Cr: 16.2-19.8, Mo: 12.6-15.4, Nb: 5.4-6.6, Ni: BAL.

In example embodiments, an article of manufacture, such as a composition of a feedstock as disclosed herein, may include Ni and in weight percent (wt %): C: about 1.4, Cr: about 16, Fe: about 1.0, Mo: about 10, Nb: about 5, Ti: about 3.8; B: about 3.5, Cu: about 14; B: 2.45-4.55, Cu: 9.8-18.2; B: 3.15-3.85, Cu: 12.6-15.4; B: about 4.0, Cr: about 10, Cu about 16; B: 2.8-5.2, Cr: 7-13, Cu: 11.2-20.8; B: 3.6-4.4, Cr: 9-11, Cu: 14.4-17.6; or C: about 1.2, Cr: about 20, Mo: about 12, Nb: about 6, Ti: about 0.5.

In example embodiments, an article of manufacture, such as a composition of a feedstock as disclosed herein, may include agglomerated and sintered blends of, in weight percent (wt %): 75-85% WC+15-25% Monel; 65-75% WC+25-35% Monel; 60-75% WC+25-40% Monel; 75-85% $Cr_3C_2$+15-25% Monel; 65-75% $Cr_3C_2$+25-35% Monel; 60-75% $Cr_3C_2$+25-40% Monel; 60-85% WC+15-40% Ni30Cu; 60-85% $Cr_3C_2$+15-40% Ni30Cu; 75-85% (50/50 vol. %) WC/$Cr_3C_2$+15-25% Monel; 75-85% (50/50 vol. %) WC/$Cr_3C_2$+25-35% Monel; 75-85% WC/$Cr_3C_2$+15-25% Monel; 75-85% WC/$Cr_3C_2$+25-35% Monel; or 60-90% hard phase+10-40% Monel alloy.

In the above, hard phases are one or more of the following: Tungsten Carbide (WC) and/or Chromium Carbide ($Cr_3C_2$). Monel is a Nickel-Copper alloy of the target composition Ni BAL 30 wt. % Cu with a common chemistry tolerance of 20-40 wt. % Cu, or more preferably 28-34 wt. % Cu with known impurities including but not limited to C, Mn, S, Si, and Fe. Monel does not include any Carbides, and thus example embodiments of the disclosure add in Carbides, such as Tungsten Carbides and/or Chromium Carbides. Tungsten Carbide is generally described by the formula W: BAL, 4-8 wt. % C. In example embodiments, Tungsten Carbide may be described by the formula W: BAL, 1.5 wt. % C.

In example embodiments with 60-85% WC+Ni30Cu, the article of manufacture may be, in weight percent: Ni: 10.5-28; Cu: 4.5-12; C: 3.66-5.2; W: 56.34-79.82.

Example embodiments include 60-85% $Cr_3C_2$+Ni30Cu, and the article of manufacture may be, in weight percent: Ni: 10.5-28; Cu: 4.5-12; C: 7.92-11.2; W: 52.1-73.78.

Thus, the above feedstock description indicates that Tungsten Carbide, a known alloy of that simple chemical formula, was mechanically blended with Monel (as described by the simple Ni30Cu formula in the prescribed ratio). During this overall process many particles stick together such that a new 'agglomerated' particle is formed. In each case the agglomerated particle is included of the described ratios.

Table 1 below lists a number of experimental alloys, with their compositions listed in weight percent.

In example embodiments, P76 alloys may be thermal spray alloys and P82 alloys may be weld overlay alloys (such as PTA or laser). However, the disclosure is not so limited. For example, any of the compositions as disclosed herein may be effective for hardfacing processes, such as for plasma transferred arc (PTA), laser cladding hardfacing processes including high speed laser cladding, and thermal spray processes such as high velocity oxygen fuel (HVOF) thermal spray.

In example embodiments, the disclosed compositions may be the wire/powder, the coating or other metallic component, or both.

The disclosed alloys may incorporate the above elemental constituents to a total of 100 wt. %. In example embodiments, the alloy may include, may be limited to, or may consist essentially of the above named elements. In example embodiments, the alloy may include 2 wt. % or less, 1 wt. % or less, 0.5 wt. % or less, 0.1 wt. % or less or 0.01 wt. % or less of impurities, or any range between any of these values. Impurities may be understood as elements or compositions that may be included in the alloys due to inclusion in the feedstock components, through introduction in the manufacturing process.

Further, the Ni content identified in all of the compositions described in the above paragraphs may be the balance of the composition, or alternatively, where Ni is provided as the balance, the balance of the composition may include Ni and other elements. In example embodiments, the balance may consist essentially of Ni and may include incidental impurities.

TABLE I

List of Experimental Nickel-Based Alloy Compositions in wt. %

| Alloy | Ni | B | C | Cr | Cu | Fe | Mn | Mo | Nb | Si | Ti | W |
|---|---|---|---|---|---|---|---|---|---|---|---|---|
| P82-X1 | 59 | | 2 | 25.5 | | | | 10.5 | 3 | | | |
| P82-X2 | 54.5 | | 2 | 30 | | | | 10.5 | 3 | | | |
| P82-X3 | 55.08 | | 1.3 | 28.95 | | 4.14 | | 7.47 | 3.06 | | | |
| P82-X4 | 48.96 | | 2.6 | 35.4 | | 3.68 | | 6.64 | 2.72 | | | |
| P82-X5 | 42.84 | | 3.9 | 41.85 | | 3.22 | | 5.81 | 2.38 | | | |
| P82-X6 | 62.8 | | 1.4 | 16 | | 1 | | 10 | 5 | | 3.8 | |
| P82-X7 | 63.1 | | 1.3 | 20 | | 1 | | 10 | 3.6 | | 1 | |
| P82-X8 | 58.5 | | 1.9 | 19 | | 1 | | 10 | 5 | | 4.6 | |
| P82-X9 | 62 | | 2 | 15 | | 1 | | 10 | 5 | | 5 | |
| P82-X10 | 66.6 | | 1.3 | 16 | | 1 | | 10 | 6 | | 0.4 | |
| P82-X11 | 69.8 | | 2 | 16 | | 1 | | 10 | 1.4 | | 1.8 | |

TABLE I-continued

List of Experimental Nickel-Based Alloy Compositions in wt. %

| Alloy | Ni | B | C | Cr | Cu | Fe | Mn | Mo | Nb | Si | Ti | W |
|---|---|---|---|---|---|---|---|---|---|---|---|---|
| P82-X12 | 66.4 | | 2 | 16 | | 1 | | 10 | 6 | | 0.6 | |
| P76-X1 | 47.6 | | 2.4 | 26 | 24 | | | | | | | |
| P76-X2 | 50.4 | | 1.6 | 22 | 26 | | | | | | | |
| P76-X3 | 53.8 | | 1.2 | 17 | 28 | | | | | | | |
| P76-X4 | 53.6 | | 2.6 | 17.4 | 26.4 | | | | | | | |
| P76-X5 | 46.9 | | 3.9 | 26.1 | 23.1 | | | | | | | |
| P76-X6 | 40.2 | | 5.2 | 34.8 | 19.8 | | | | | | | |
| P76-X1-1 | 47.6 | | 2.4 | 26 | 24 | | | | | | | |
| P76-X6-1 | 40.2 | | 5.2 | 34.8 | 19.8 | | | | | | | |
| P76-X6-2 | 40.2 | | 5.2 | 34.8 | 19.8 | | | | | | | |
| P76-X7 | 63.2 | | 0.8 | | 29 | | | | 6 | | 1 | |
| P76-X8 | 60.8 | | 1.2 | | 28 | | | | 9 | | 1 | |
| P76-X9 | 65 | | 1 | | 25 | | | | 8 | | 1 | |
| P76-X10 | 60 | | 2 | | 30 | | | | | | 8 | |
| P76-X11 | 64 | | 1 | | 31 | | | | | | 4 | |
| P76-X12 | 58.5 | | 2.5 | | 28 | | | | | | 11 | |
| P76-X13 | 59.22 | | 2 | | 27.72 | 1.98 | 1.08 | | | | 8 | |
| P76-X14 | 52.64 | | 4 | | 24.64 | 1.76 | 0.96 | | | | 16 | |
| P76-X14_2 | 53.36 | | 4 | | 26.72 | | | | | | 16 | |
| P76-X15 | 46.69 | | 6 | | 23.38 | | | | | | 24 | |
| P76-X17 | 53.36 | | 2.28 | | 26.72 | | | | 18 | | | |
| P76-X18 | 46.69 | | 3.42 | | 23.38 | | | | 27 | | | |
| P76-X19 | 19.98 | | 9.1 | 60.9 | 10.02 | | | | | | | |
| P76-X20 | 38.86 | | 5.6 | 34.8 | 19.14 | | | | | | 1.6 | |
| P76-X21 | 82 | 2 | | | 10 | | | 5.00 | | 1.0 | | |
| P76-X22 | 76.5 | | 2.5 | | 10 | | | 10.00 | | 1.0 | | |
| P76-X23 | 82.5 | | 3.5 | | 14 | | | | | | | |
| P76-X24 | 70 | | 4 | 10 | 16 | | | | | | | |
| P76-X25 | 78 | | 4 | | 11 | | | 7.00 | | | | |
| P76-X26 | 71 | | 2 | | 22 | | | 5.00 | | | | |
| P76-X27 | 71.5 | | 3.5 | | 13 | | | | | | | 12 |
| P76-X28 | 76.5 | | 3.5 | | 13 | | | | | | | 7 |

Thermodynamic Criteria:

In example embodiments, alloys may be characterized by their equilibrium thermodynamic criteria. In example embodiments, the alloys may be characterized as meeting some of the described thermodynamic criteria. In example embodiments, the alloys may be characterized as meeting all of the described thermodynamic criteria.

A first thermodynamic criterion pertains to the total concentration of hard particles in the microstructure. As the mole fraction of hard particles increases, the bulk hardness of the alloy may increase, thus the wear resistance may also increase, which may be advantageous for hardfacing applications. For the purposes of this disclosure, hard particles may be defined as phases that exhibit a Vickers hardness of 1000 or greater. The total concentration of hard particles may be defined as the total mole % of all phases that meet or exceed a Vickers hardness of about 1000 and is thermodynamically stable at about 1500K in the alloy.

In example embodiments, the hard particle fraction is 3 mole % or greater, 4 mole % or greater, 5 mole % or greater, 8 mole % or greater, 10 mole % or greater, 12 mole % or greater, 15 mole % or greater, 20 mole % or greater, 30 mole % or greater, 40 mole % or greater, 50 mole % or greater, 60 mole % or greater, or any range between any of these values.

In example embodiments, the hard particle fraction may be varied according to the intended process of the alloy. For example, for thermal spray alloys, the hard particle fraction may be between 40 and 60 mol. %. For alloys intended to be welded via laser, plasma transfer arc, or other wire welding application the hard particle phase fraction may be between 15 and 30 mol. %.

A second thermodynamic criterion pertains to the amount of hypereutectic hard phases that form in the alloy. A hypereutectic hard phase is a hard phase that begins to form at a temperature higher than the eutectic point of the alloy. The eutectic point of these alloys is the temperature at which the face-centered cubic (FCC) matrix begins to form.

In example embodiments, hypereutectic hard phases total to 40 mol. % or more, 45 mol. % or more, 50 mol. % or more, 60 mol. % or more, 70 mol. % or more, 75 mol. % or more, or 80 mol. % or more of the total hard phases present in the alloy, or any range between any of these values.

A third thermodynamic criterion pertains to the corrosion resistance of the alloy. The corrosion resistance of Nickel-based alloys may increase with higher weight percentages of Chromium and/or Molybdenum present in the FCC matrix. This third thermodynamic criterion measures the total weight % of Chromium and Molybdenum in the FCC matrix at about 1500K.

In example embodiments, the total weight percentage (wt %) of Chromium and Molybdenum in the matrix is 15 weight % or greater, 18 weight % or greater, 20 weight % or greater, 23 weight % or greater, 25 weight % or greater, 27 weight % or greater, 30 weight % or greater, or any range between any of these values.

A fourth thermodynamic criterion relates to the matrix chemistry of the alloy. In example embodiments, it may be beneficial to maintain a similar matrix chemistry to a known alloy such as, for example, Monel 400. In example embodiments, to maintain a similar matrix chemistry to a known alloy, the matrix chemistry of alloys at 1300K was compared to those of a known alloy. Comparisons of this sort are termed Matrix Proximity. For example, Monel Cr: 28-34, Ni: BAL.

In example embodiments, the matrix proximity is 50% or greater, 55 or greater, 60% or greater, 70% or greater, 80% or greater, 85% or greater, 90% or greater, of the above alloy.

Matrix proximity may be determined in a number of ways, such as energy dispersive spectroscopy (EDS).

The equation below may be used to calculate the similarity or proximity of the modelled alloy matrix to an alloy of known corrosion resistance. A value of 100% means an exact match between the compared elements.

$$\sum_{n=1}^{m} \frac{r_n}{\Sigma r_n}\left(1 - \left|\frac{r_n - xn}{r_n}\right|\right)$$

$r_n$ is the percentage of the $n^{th}$ element in the reference alloy;
$x_n$ is the calculated percentage of the $n^{th}$ element in the matrix of the modelled alloy;
$\Sigma r_n$ is the total percentage of elements under comparison;
m is the number of solute elements used in the comparison.

A fifth thermodynamic criterion relates to the liquidus temperature of the alloy, which may help determine the alloy's suitability for the gas atomization manufacturing process. The liquidus temperature is the lowest temperature at which the alloy is still 100% liquid. A lower liquidus temperature generally corresponds to an increased suitability to the gas atomization process. In example embodiments, the liquidus temperature of the alloy may be 1850 K or lower. In example embodiments, the liquidus temperature of the alloy may be 1600 K or lower. In example embodiments, the liquidus temperature of the alloy may be 1450 K or lower.

Figure 2:
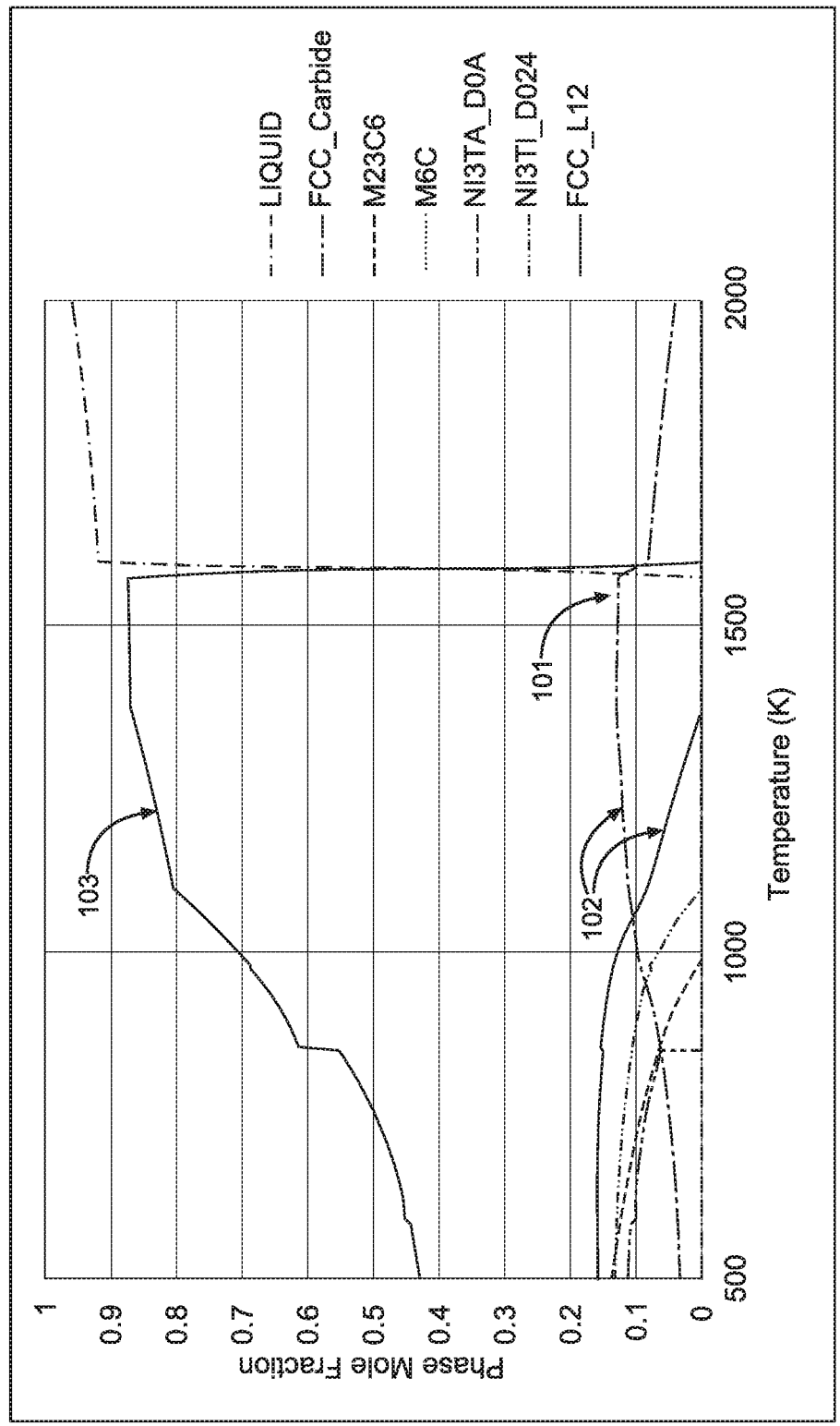
FIG. 2 illustrates a phase mole fraction vs. temperature diagram of alloy P82-X6 showing the mole fraction of phases present in an alloy at different temperatures, in accordance with example embodiments.

The thermodynamic behavior of alloy P82-X6 is shown in FIG. 2. The diagram depicts a material which precipitates a hypereutectic FCC Carbide 101 in a Nickel matrix 103, which is greater than 5% at 1500K. 101 depicts the FCC Carbide fraction as a function of temperature, which forms an isolated hypereutectic phase. 102 specifies the total hard phase content at 1300 K, which includes the FCC Carbide in addition to an M6C Carbide. Thus, the hypereutectic hard phases make up more than 50% of the total hard phases of the alloy. 103 species the matrix of the alloy, which is FCC_L12 Nickel matrix. The matrix proximity of the alloy 103 is greater than 60% when compared to Inconel 625.

A $M_6C$ type Carbide also precipitates at a lower temperature to form a total Carbide content of about 15 mol. % at 1300K (12.6% FCC Carbide, 2.4% $M_6C$ Carbide). The FCC Carbide representing the isolated Carbides in the alloy and forming the majority (>50%) of the total Carbides in the alloy. The arrow points specifically to the point at which the composition of the FCC_L12 matrix is mined for insertion into the matrix proximity equation. As depicted in this example, the volume fraction of all hard phases exceeds 5 mole %, with over 50% of the Carbide fraction forming as a hypereutectic phase known to form an isolated morphology with the remaining FCC_L12 matrix phase possessing over 60% proximity with Inconel 625.

In this calculation, although not depicted in FIG. 2, the matrix composition is 18 wt. % Cr, 1 wt. % Fe, 9 wt. % Mo, and 1 wt. % Ti, balance Nickel. It may be appreciated that the matrix chemistry of P82-X6 is completely different than the bulk chemistry of P82-X6. P82-X6 is designed to have corrosion performance similar to Inconel 625 and the matrix proximity with Inconel 625 is 87%.

Figure 3:
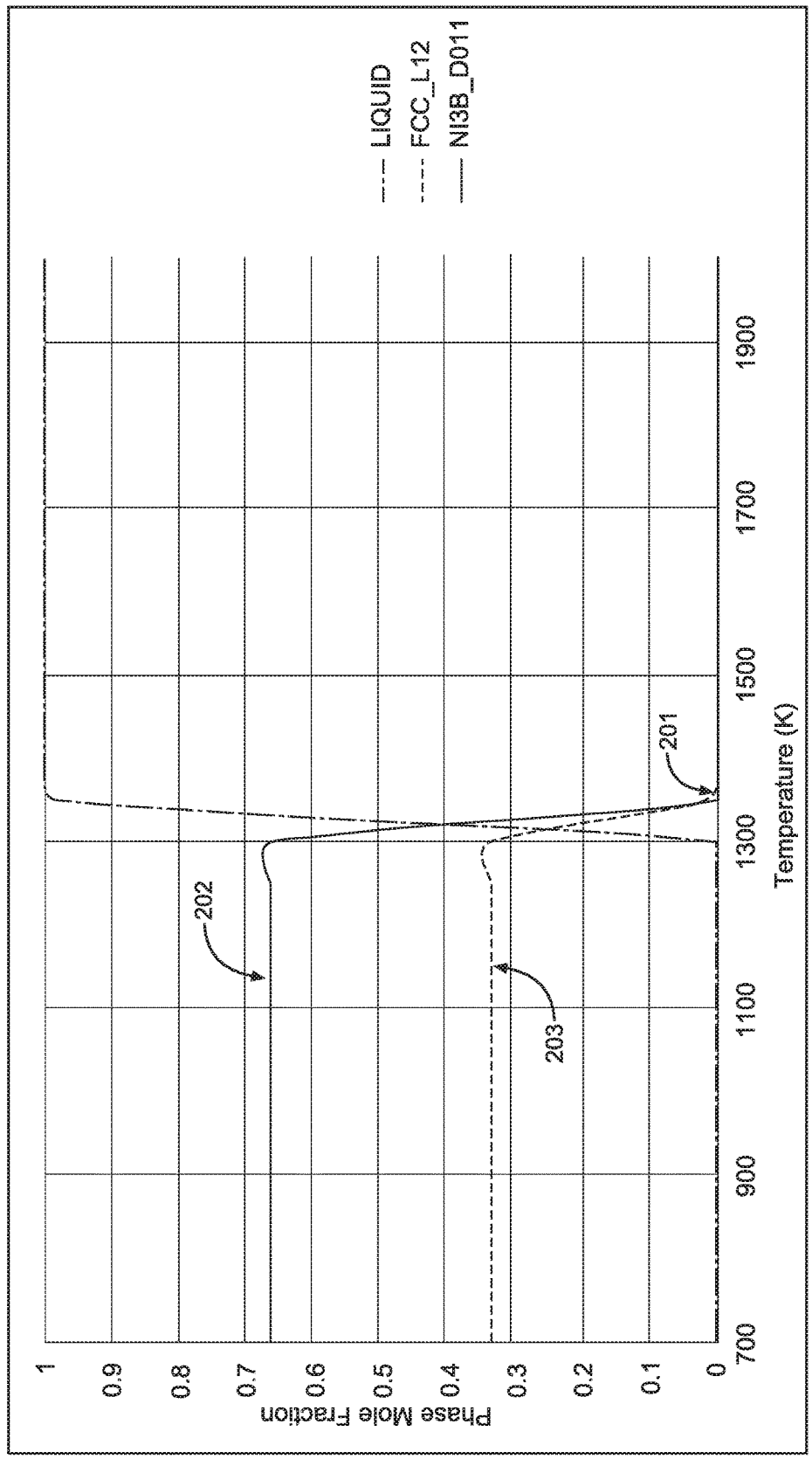
FIG. 3 illustrates a phase mole fraction vs. temperature diagram of alloy P76-X23 showing the mole fraction of phases present in an alloy at different temperatures, in accordance with example embodiments.

The thermodynamic behavior of alloy P76-X23 is shown in FIG. 3. The diagram depicts a material which precipitates a eutectic $Ni_3B$ 203 in a Nickel matrix 201. 201 calls out the liquidus temperature of the alloy, which is below 1850K according to a preferred embodiment. 202 depicts the mole fraction of hard phases in the alloy, in this case Nickel Boride ($Ni_3B$) which exceeds 5 mol. % at 1200K. 203 depicts the matrix phase fraction in which case the matrix chemistry is mined at 1200K and the matrix proximity is over 60% with Monel. The liquidus temperature of the alloy is 1400 K which makes the material very suitable for gas atomization. $Ni_3B$ is that hard phase in this example and is present at a mole fraction of 66% at 1300K. The matrix chemistry is 33 wt. % Cu, balance Nickel. It may be appreciated that the matrix chemistry of P76-X23 is completely different than the bulk chemistry of P76-X23. P76-X23 is designed to have corrosion performance similar to Monel 400 and the matrix proximity of P76-X23 with Monel 400 is 100%.

Microstructural Criteria

In example embodiments, alloys may be described by their microstructural criterion. In example embodiments, the alloys may be characterized as meeting some of the described microstructural criteria. In example embodiments, the alloys may be characterized as meeting all of the described microstructural criteria.

A first microstructural criterion pertains to the total measured volume fraction of hard particles. For the purposes of this disclosure, hard particles may be defined as phases that exhibit a Vickers hardness of 1000 or greater. The total concentration of hard particles may be defined as the total mole % of all phases that meet or exceed a Vickers hardness of 1000 and is thermodynamically stable at 1500K in the alloy. In example embodiments, an alloy possesses at least 3 volume %, at least 4 volume %, at least 5 volume %, at least 8 volume %, at least 10 volume %, at least 12 volume %, at least 15 volume % of hard particles, at least 20 volume % of hard particles, at least 30 volume % of hard particles, at least 40 volume % of hard particles, at least 50 volume % of hard particles, or any range between any of these values.

In example embodiments, the hard particle fraction may be varied according to the intended process of the alloy. For example, for thermal spray alloys, the hard particle fraction may be between 40 and 60 vol. %. For alloys intended to be welded via laser, plasma transfer arc, or other wire welding application the hard particle phase fraction may be between 15 and 30 vol. %.

A second microstructural criterion pertains to the fraction of hypereutectic isolated hard phases in an alloy. Isolated, as used herein, include embodiments in which the particular isolated phase (such as spherical or partially spherical particles) remains unconnected from other hard phases. For example, an isolated phase may be 100% enclosed by the matrix phase. This may be in contrast to rod-like phases which may form long needles that act as low toughness "bridges," allowing cracks to work through the microstructure.

To reduce the crack susceptibility of an alloy it may be beneficial to form isolated hypereutectic phases rather than continuous grain boundary phases. In example embodiments, isolated hypereutectic hard phases total 40 vol. % or more, 45 vol. % or more, 50 vol. % or more, 60 vol. % or more, 70 vol. % or more, 75 vol. % or more, or 80 vol. % or more of the total hard phase fraction present in the alloy, or any range between any of these values.

A third microstructural criterion pertains to the increased resistance to corrosion in the alloy. To increase the resistance to corrosion in Nickel based alloys it may be beneficial to have a high total weight % of Chromium and Molybdenum in a matrix. In example embodiments, the total content of Chromium and Molybdenum in the matrix, measured via EDS, may be 15 weight % or higher, 18 weight % or higher, 20 weight % or higher, 23 weight % or higher, 25 weight % or higher, 27 weight % or higher, 30 weight % or higher, or any range between any of these values.

A fourth microstructural criterion pertains to the matrix proximity of an alloy compared to that of a known alloy such as, for example, Monel. An Energy Dispersive Spectrometer (EDS) was used to measure the matrix chemistry of the alloy. In example embodiments, the matrix proximity is 50% or greater, 55% or greater, 60% or greater, 70% or greater, 80% or greater, 85% or greater, 90% or greater of the known alloy, or any range between any of these values.

Figure 4:
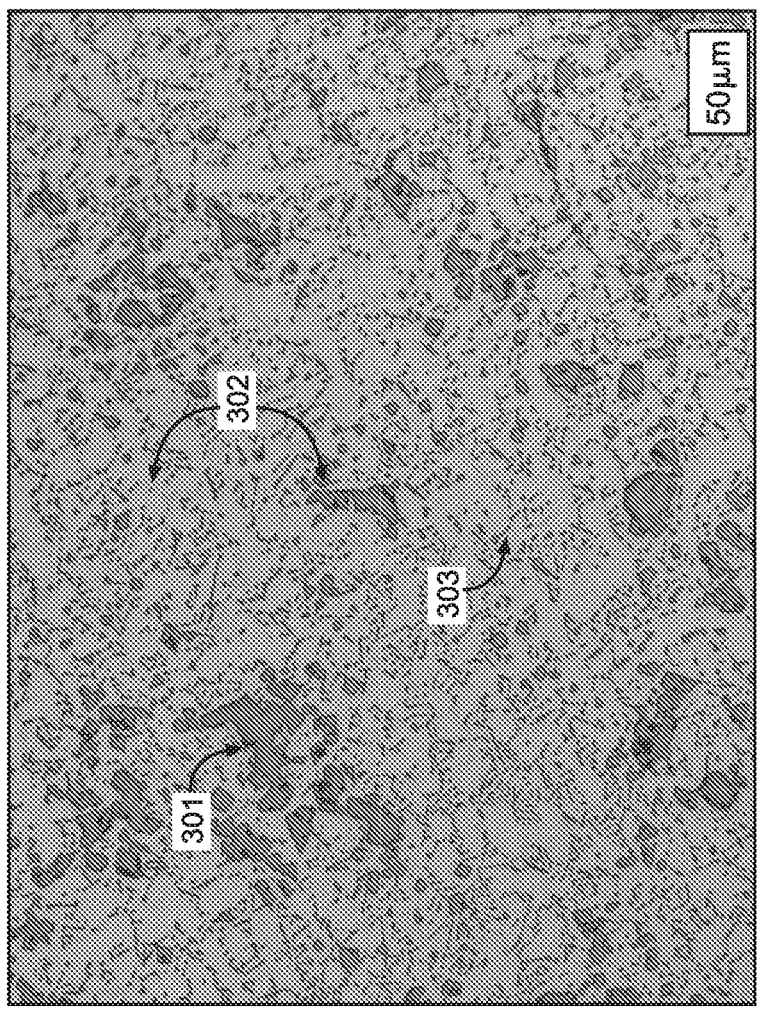
FIG. 4 shows an SEM image of one example embodiment of an alloy P82-X6 with hard phases, hypereutectic hard phases, and a matrix.

FIG. 4 shows an SEM image of a microstructure for the P82-X6 as produced via PTA welding. In this case, the alloy was created as a powder blend for experimental purposes. 301 highlights the isolated Niobium Carbide precipitates, which have a volume fraction at 1500K of greater than 5%, 302 highlights the hypereutectic hard phases, which makes up more than 50% of the total hard phases in the alloy, and 303 highlights the matrix, which has a matrix proximity greater than 60% when compared to Inconel 625. The Carbide precipitates form a combination of isolated (larger size) and eutectic morphology (smaller size) both contributing to the total hard phase content. In this example the hard phases of isolated morphology make up over 50 vol. % of the total Carbide fraction.

Performance Criteria

In example embodiments, a hardfacing layer is produced via a weld overlay process including, but not limited to, PTA cladding or laser cladding.

In example embodiments, an alloy may have a number of advantageous performance characteristics. In example embodiments, it may be advantageous for an alloy to have one or more of 1) a high resistance to abrasion, 2) minimal to no cracks when welded via a laser cladding process or other welding method, and 3) a high resistance to corrosion. The abrasion resistance of hardfacing alloys may be quantified using the ASTM G65A dry sand abrasion test. The crack resistance of the material may be quantified using a dye penetrant test on the alloy. The corrosion resistance of the alloy may be quantified using the ASTM G48, G59, and G61 tests. All of the listed ASTM tests are hereby incorporated by reference in their entirety.

In example embodiments, a hardfacing layer may have an ASTM G65A abrasion loss of less than 250 mm$^3$, less than 100 mm$^3$, less than 30 mm$^3$, or less than 20 mm$^3$. In example embodiments, the hardfacing layer may exhibit 5 cracks per square inch, 4 cracks per square inch, 3 cracks per square inch, 2 cracks per square inch, 1 crack per square inch, 0 cracks per square inch of coating, or any range between any of these values. In example embodiments, a crack is a line on a surface along which it has split without breaking into separate parts.

In example embodiments, the hardfacing layer may have a corrosion resistance of 50% or greater, 55% or greater, 60% or greater, 70% or greater, 80% or greater, 85% or greater, 90% or greater, 95% or greater, 98% or greater, 99% or greater, 99.5% or greater than a known alloy, or any range between any of these values. In example embodiments, the alloy may have a corrosion rate of 1 mpy or less in an about 28% $CaCl_2$ electrolyte, pH=9.5 environment. In example embodiments, the alloy may have a corrosion rate of 0.6 mpy or less in an about 28% $CaCl_2$ electrolyte, pH=9.5 environment. In example embodiments, the alloy may have a corrosion rate of 0.4 mpy or less in an about 28% $CaCl_2$ electrolyte, pH=9.5 environment. In example embodiments, the alloy may have a corrosion resistance in a 3.5% sodium chloride solution for 16 hours according to G-59/G-61 of below 0.1 mpy. In example embodiments, the alloy may have a corrosion resistance in a 3.5% sodium chloride solution for 16 hours according to G-59/G-61 of below 0.08 mpy.

In example embodiments, a hardfacing layer is produced via a thermal spray process including but not limited to high velocity oxygen fuel (HVOF) thermal spray.

In example embodiments, the Vickers hardness of the coating may be 650 or higher. In example embodiments, the Vickers hardness of the thermal spray process may be 700 or higher. In example embodiments, the Vickers hardness of the thermal spray process may be 900 or higher. In example embodiments, the adhesion of the thermal spray coating may be 7,500 psi or greater. In example embodiments, the adhesion the adhesion of the thermal spray coating may be 8,500 psi or greater. In example embodiments, the adhesion the adhesion of the thermal spray coating may be 9,500 psi or greater.

EXAMPLES

Example 1: PTA Welding of P82-X6

Figure 5:
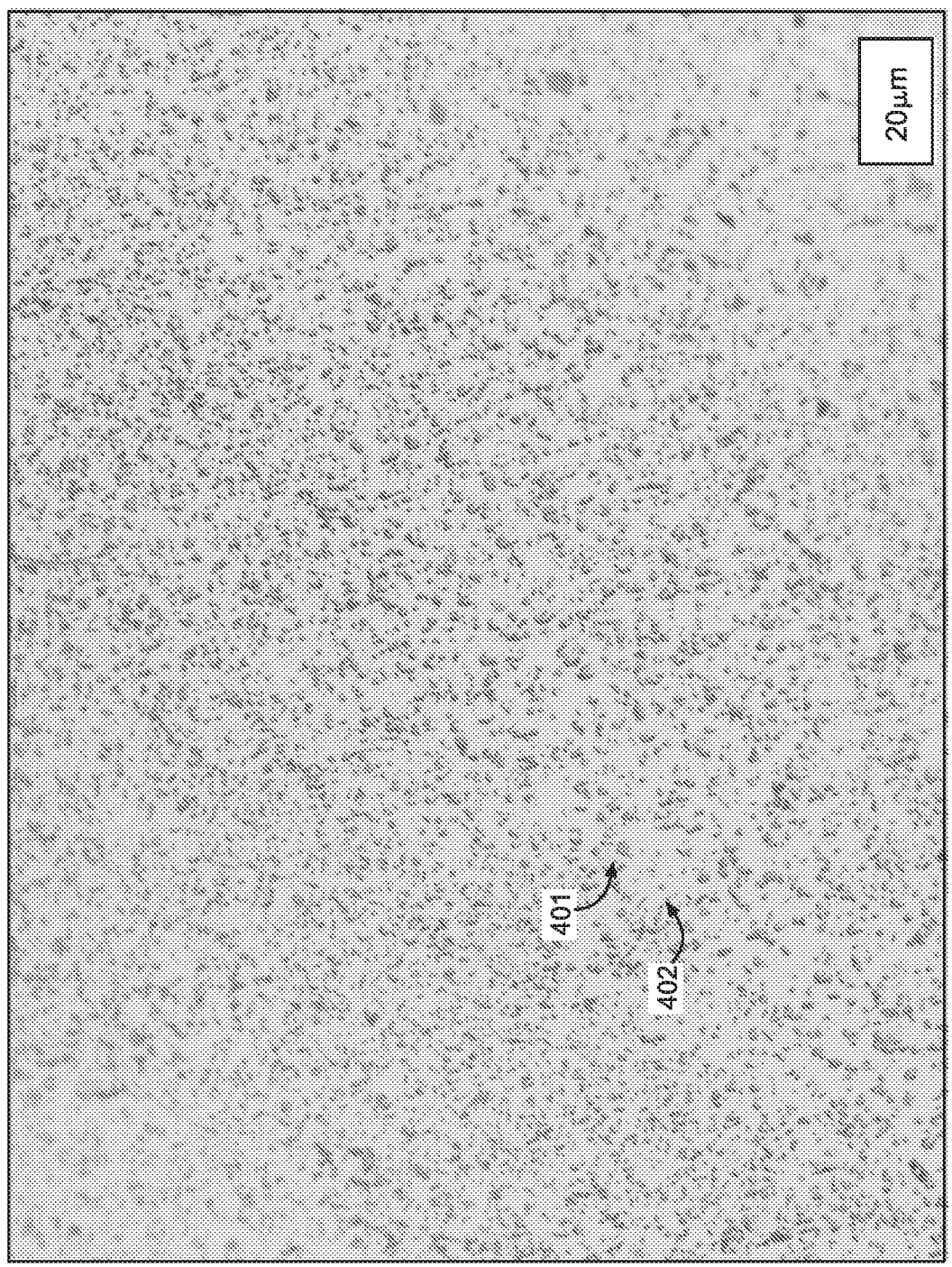
FIG. 5 shows an optical microscopy image of P82-X6 laser welded from the gas atomized powder per example 1, parameter set 1.

Alloy P82-X6 was gas atomized into a powder of 53-150 μm particle size distribution as suitable for PTA and/or laser cladding. The alloy was laser clad using two parameter sets: 1) 1.8 kW laser power and 20 L/min flow rate, and 2) 2.2 kW laser power and 14 L/min flow rate. In both cases, the coating showed fine isolated niobium/titanium Carbide precipitates 401 in a Nickel matrix 402 as intended as shown in FIG. 5. The 300 grams-force Vickers hardness of the laser claddings was 435 and 348 for parameter sets 1 and 2, respectively. The ASTM G65 tests were 1.58 g lost (209 mm$^3$) and 1.65 g (200 mm$^3$) lost for parameters sets 1 and 2, respectively.

Example 2: HVOF Spraying of P76-X23 and P76-X24

Figure 6:
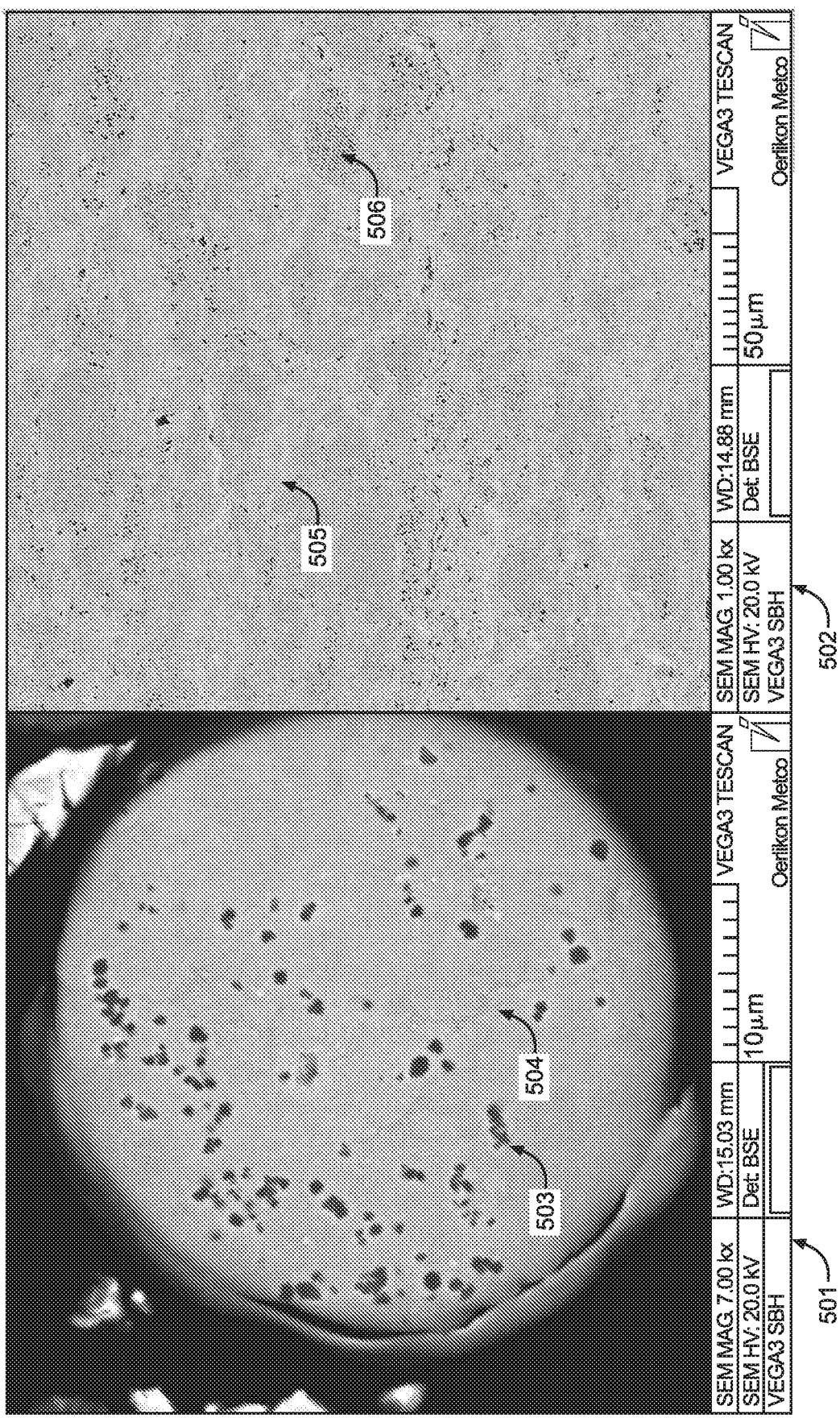
FIG. 6 shows SEM images of the gas atomized powder 501 and resultant coating 502 of the P76-X24 alloy per example 2.

Alloys P76-X23 and P76-X24 were gas atomized into powders of 15-45 μm particle size distribution as suitable for HVOF thermal spray processing. Both powders forms an extremely fine scale morphology where a Nickel matrix phase and Nickel Boride phase appear to be both present as predicted via the computational modelling, but very difficult to distinguish and measure quantitatively. As shown in FIG. 6, 501 being the gas atomized powder and 502 being the resultant coating of the powder, in addition to the matrix and Ni Boride phase 504 (e.g., the eutectic Nickel/Nickel Boride structure of the gas atomized powder), the P76-X24 alloy also forms Chromium Boride precipitates 503 as predicted by the model as fine isolated particles. 505 highlights a region of primarily Nickel/Nickel Boride eutectic structure in the HVOF sprayed coating, and 506 highlights a region containing many Chromium Boride precipitates in the coating. Both alloys were HVOF sprayed to 200-300 μm coating thickness and formed dense coatings. The 300 grams-force Vickers hardness of the coatings were 693 and 726 for P76-X23 and P76-X24, respectively. P76-X23 adhesion tests result in glue failure up to 9,999 psi, and P76-X24 showed 75% adhesion, 25% glue failure in two tests reaching 9,576 and 9,999 psi. ASTM G65A (converted from an ASTM G65B test) testing showed 87 mm$^3$ lost for P76-X24. ASTM G65A testing uses 6,000 revolutions, procedure B uses 2,000 revolutions and is typically used for thin coatings such as thermal spray coatings.

P76-X24 was tested in an about 28% CaCl$_2$ electrolyte, pH=9.5 resulting in a measured corrosion rate of 0.4 mpy. In comparison, cracked hard chrome exhibits a rate of 1.06 mpy in a similar environment. Hard Cr is used as a relevant coating for a variety of application requiring both corrosion and abrasion resistance. In example embodiments, the alloy in the form of an HVOF coating produces a corrosion rate of 1 mpy or less in an about 28% CaCl$_2$ electrolyte, pH=9.5 environment. In example embodiments, the alloy in the form of an HVOF coating may produce a corrosion rate of 0.6 mpy or less in an about 28% CaCl$_2$ electrolyte, pH=9.5 environment. In example embodiments, the alloy in the form of an HVOF coating may produce a corrosion rate of 0.4 mpy or less in an about 28% CaCl$_2$ electrolyte, pH=9.5 environment. In example embodiments, the alloy in the form of an HVOF coating produces a non-permeable coating per ECP (electrochemical potential) testing.

Example 3: HVOF Spraying of a WC/Cr3C2, Ni Alloy Matrix Blends

Figure 7:
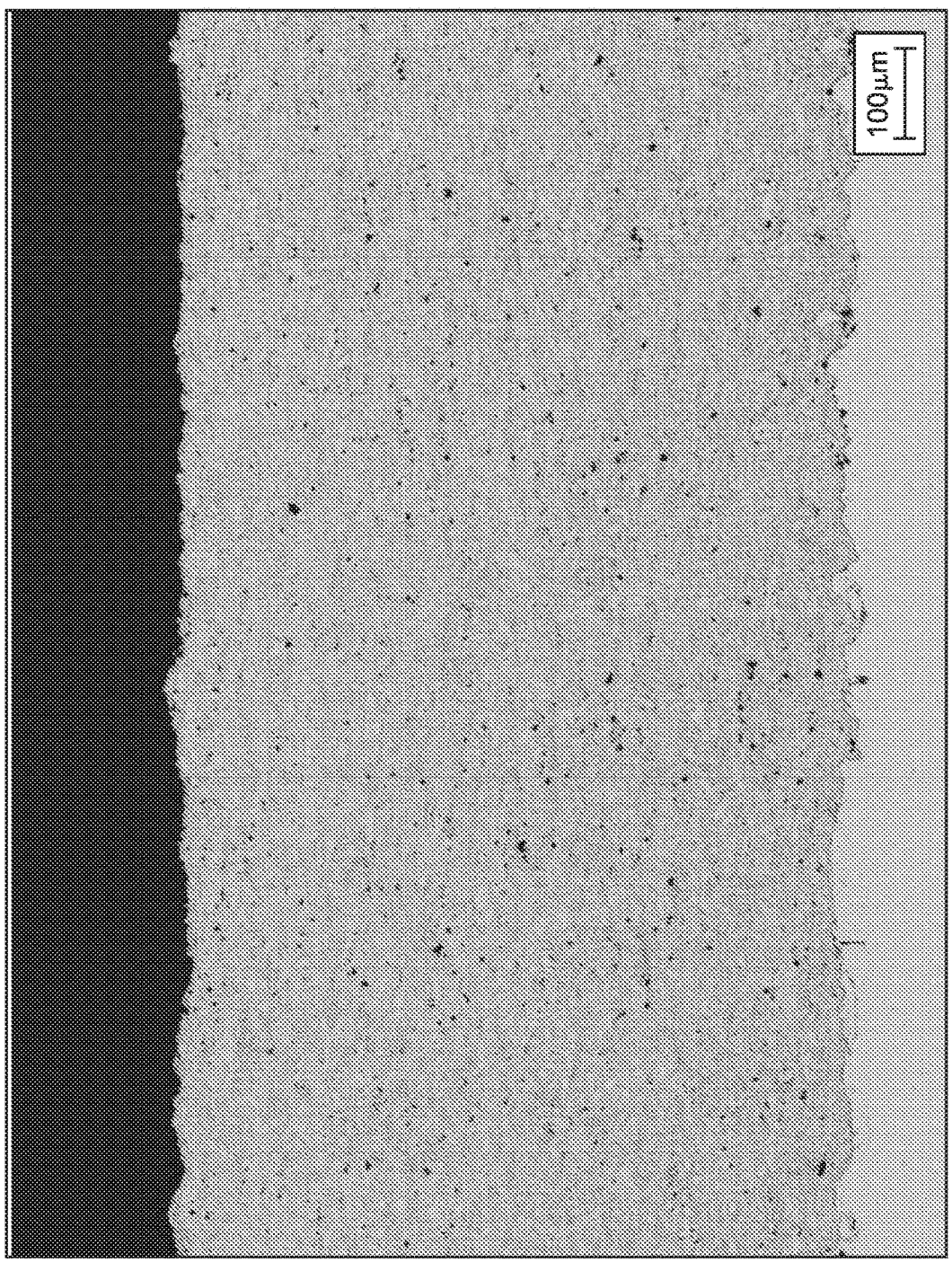
FIG. 7 shows an SEM image of an HVOF coating deposited from agglomerated and sintered powder of $WC/Cr_3C_2$+Ni alloy per example 3, specifically a blend of 80 wt. % $WC/Cr_3C_2$ (50/50 vol %) mixed with 20 wt. % Monel, in accordance with example embodiments.

A blend of a blend of 80 wt. % WC/Cr3C2 (50/50 vol %) mixed with 20 wt. % Monel was agglomerated and sintered into 15-45 µm as suitable for thermal spray processing. The HVOF coating, as shown in FIG. 7, possessed a 300 gram-force Vickers hardness of 946 forming a dense coating of 0.43% measured porosity. The HVOF coating produced an ASTM G65A mass loss of about 12 mm$^3$. FIG. 7 illustrates an SEM image of an agglomerated and sintered powder of WC/Cr$_3$C$_2$+Ni alloy per example 3, specifically a blend of 80 wt. % WC/Cr3C2 (50/50 vol %) mixed with 20 wt. % Monel.

Example 4: Weld Studies of P82-X13, 14, 15, 18, 19 in Comparison with Inconel 625

A weld study was conducted evaluating several alloys of differing Carbide contents and morphologies in comparison to Inconel 625. All of the alloys in the study were intended to form a matrix similar to Inconel 625, which is quantified by the matrix proximity, 100% equating to a matrix which is exactly similar to the Inconel 625 bulk composition. All the alloys were laser welded in three overlapping layers to test for crack resistance. Similarly, two layer welds of each alloy were produced via plasma transferred arc welding to test for cracking and other properties.

TABLE 1

Comparison of All Microstructures

| Alloy Name | GB Hard Phase | Iso Hard Phase | Matrix Proximity |
|---|---|---|---|
| Inconel 625 | 0% | 0% | 100% |
| P82-X13 | 10.50% | 0% | 100% |
| P82-X14 | 20.10% | 0% | 99% |
| P82-X15 | 30.40% | 0% | 84% |
| P82-X18 | 9.90% | 8.10% | 98% |
| P82-X19 | 20.00% | 8.00% | 98% |

The P82-X18 represents an example embodiment of this disclosure producing favorable results at the conclusion of this study. P82-X18 is significantly harder than Inconel 625 in both processes, PTA and laser. Despite the increased hardness, no cracking was evident in the laser or PTA clad specimens. P82-X18 exhibits improved abrasion resistance as compared to Inconel 625 in both processes. The general trend for increased hardness is true for all the tested alloys as demonstrated in Table 2. However, the increased hardness does not generate an increased abrasion resistance in all cases. P82-X13, P82-X14, and P82-X15 all exhibited higher wear rates than Inconel 625 despite being harder and containing Carbides. This result demonstrates the discovered advantageous Carbide morphology as compared to total Carbide fraction and alloy hardness.

Alloy P82-X18 meets thermodynamic, microstructural, and performance criteria of example embodiments of this disclosure. P82-X18 is predicted to form 8.1 mol. % isolated Carbides and forms 8-12% isolated Carbides in the studied and industrially relevant weld processes. The alloy is also predicted to form 9.9 mol % grain boundary hard phases, and indeed forms grain boundary hard phases of 10 vol. % or less. The isolated Carbide content is in excess of 40% of the total Carbide content in the alloy. This elevated ratio of isolated Carbide fraction provides enhanced wear resistance beyond what may be expected of total Carbide fraction alone.

TABLE 2

Comparison of Test Alloy Microhardness Values

| Hardness HV$_1$ | Inco 625 | X13 | X14 | X15 | X18 | X19 |
|---|---|---|---|---|---|---|
| Ingot | 217 | 252 | 303 | 311 | 333 | 360 |
| PTAW | 236 | 309 | 342 | 376 | 375 | 394 |
| LASER | 282 | 338 | 370 | 424 | 389 | 438 |

TABLE 3

Comparison of Abrasion Performance, ASTM G65 A mm$^3$ lost, of Test Alloys

|  | PTAW | LASER |
|---|---|---|
| Inco 625 |  | 232 |
| X13 | 259 | 256 |
| X14 | 256 | 267 |
| X15 | 279 | 266 |
| X18 | 184 | 201 |
| X19 | 203 | 224 |

The matrix of P82-X18 was measured via EDS which yielded Cr: 19-20 wt. %, Mo: 10-12 wt., %, Ni: Balance. Thus, the matrix composition is quite similar and somewhat overlapping with a typical Inconel 625 manufacturing range which is: Cr: 20-23, Mo: 8-10, Nb+Ta: 3.15-4.15, Ni: BAL. P82-X18 was tested in G-48 ferric chloride immersion testing for 24 hours and, similar to Inconel 625, showed no corrosion. P82-X18 was corrosion tested in a 3.5% Sodium Chloride solution for 16 hours according to G-59/G-61 ASTM standard and measured a corrosion rate of 0.075-0.078 mpy (mils per year).

In example embodiments, the measured corrosion rate of the material in a 3.5% Sodium Chloride solution for 16 hours according to G-59/G-61 is below 0.1 mpy. In example embodiments, the measured corrosion rate of the material in a 3.5% Sodium Chloride solution for 16 hours according to G-59/G-61 is below 0.08 mpy.

In example embodiments, the alloys disclosed herein, for example P82-X18, may be used in exchange for Nickel or other common materials as the metal component in Carbide metal matrix composites (MMCs). Common examples of the type of MMCs include by weight WC 60 wt. %, Ni 40 wt. %. Utilizing P82-X18 in this example would yield an MMC of the type: WC 60 wt. %, P82-X18 40 wt. %. A variety of Carbide ratios and Carbide types may be used.

Example 5: HVOF Spray Study of P82-X18

P82-X18 was thermally sprayed using the hydrogen fueled HVOF process. The resultant coating had an adhesion strength of 10,000 psi, 700 HV300 Vickers hardness, and an ASTM G65B mass loss of 0.856 (10.4.6 g/mm$^3$ volume loss).

Example 6: HVOF Spray Study of 30% Ni—Cu Agglomerated and Sintered Materials Two powders were manufactured via the agglomeration and sintering process according to the formulas: 1) 65-75% WC/Cr$_3$C$_2$+25-35% Ni—Cu alloy and 2) 65-75% Cr$_3$C$_2$+25-35% Ni—Cu alloy. To clarify the first blend, 65-75% of the total volume fraction of the agglomerated and sintered particle is Carbide, the remainder being the Ni—Cu metal alloy. The Carbide content of the particle is itself composed of a combination of both WC and Cr$_3$C$_2$ Carbide types. In example embodiments, the WC/Cr$_3$C$_2$ ratio is from 0 to 100 by volume. In example embodiments, the WC/Cr$_3$C$_2$ ratio is 0.33 to 3 by volume. In example embodiments, the WC/Cr$_3$C$_2$ ratio is 0.25 to 5 by volume. In example embodiments, the WC/Cr$_3$C$_2$ ratio is 0.67 to 1.5. The composition of the Ni—Cu alloy is Cu: 20-40 wt. %, preferably Cu: 25-35 wt. %, still preferably: Cu: 28-34 wt. %, balance Nickel with other common impurities below 3 wt. % each.

Both powders were sprayed via the HVOF process to form coatings which were then tested. Coatings produced from powder 1 and powder 2 demonstrated corrosion rates 0.15 mpy and 0.694 mpy respectively in the about 28% CaCl$_2$ electrolyte, pH=9.5 solution. Coatings produced from powder 1 and powder 2 were non-permeable as measured via ECP testing. Coatings produced from powder 1 and powder 2 demonstrated abrasion volume losses in ASTM G65A of 11.3 mm$^3$ and 16.2 mm$^3$ respectively. Coatings produced from powder 1 and powder 2 demonstrated microhardness values of 816 HV300 and 677 HV300 respectively. Coatings produced from both powders had bond strengths in excess of 12,500 psi.

Applications

The alloys described in this disclosure may be used in a variety of applications and industries. Some non-limiting examples of applications of use include, in addition to the above-discussed gate valves: surface mining, marine, power industry, oil and gas, and glass manufacturing applications.

Surface mining applications include the following components and coatings for the following components: Wear resistant sleeves and/or wear resistant hardfacing for slurry pipelines, mud pump components including pump housing or impeller or hardfacing for mud pump components, ore feed chute components including chute blocks or hardfacing of chute blocks, separation screens including but not limited to rotary breaker screens, banana screens, and shaker screens, liners for autogenous grinding mills and semi-autogenous grinding mills, ground engaging tools and hardfacing for ground engaging tools, wear plate for buckets and dump truck liners, heel blocks and hardfacing for heel blocks on mining shovels, grader blades and hardfacing for grader blades, stacker reclaimers, sizer crushers, general wear packages for mining components and other comminution components.

From the foregoing description, it will be appreciated that inventive Nickel-based, Copper-based, or Nickel-Copper-based hardfacing alloys and methods of use are disclosed. While several components, techniques and aspects have been described with a certain degree of particularity, it is manifested that many changes may be made in the specific designs, constructions and methodology herein above described without departing from the spirit and scope of this disclosure.

The following publications are incorporated herein by reference in their entirety:

U.S. Pat. No. 8,146,889; PCT application PCT/EP2018/071248; WO2013/129939; and US 2004/0118455.

Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described may be incorporated in the example methods and processes. For example, one or more additional methods may be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems may generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges may be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments may be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions may be made of equivalents without departing from the unique and inventive disclosure herein or the scope of the claims.

What is claimed is:

1. An apparatus for controlling well fluids, the apparatus comprising:
    a gate valve having a body, the body having a cavity and a flow passage intersecting the cavity;
    a seat ring mounted to the body at the intersection of the flow passage and the cavity, the seat ring having an engaging face formed of a steel alloy;
    a gate in the cavity and having an engaging face formed of a steel alloy that slidingly engages the face of the seat ring while being moved between open and closed positions;
    a hardened outer layer formed on the engaging face of the seat ring, the hardened layer formed of a Cobalt-free feedstock material and the hardened layer comprising Tungsten Carbide in a Cobalt-free matrix;
    a friction-resistant coating of diamond-like carbon on the hardened outer layer, and
    wherein the hardened layer exhibits two cracks or fewer per square inch, has an adhesion of 9,000 psi or greater, and has a porosity of 2 volume % or less.

2. The apparatus of claim 1, wherein the Cobalt-free feedstock material comprises, in wt. %:
    Ni: Balance
    C: 0.5-2;
    Cr: 10-30;
    Mo: 5.81-18.2;
    Nb+Ti: 2.38-10.

3. The apparatus of claim 1, wherein the Cobalt-free feedstock material comprises, in wt. %:
    Ni: Balance
    C: about 0.84-about 1.56;
    Cr: about 14-about 26;
    Mo: about 8.4-about 15.6;
    Nb: about 4.2-about 7.8; and
    Ti: about 0.35-about 0.65.

4. The apparatus of claim 1, wherein the Cobalt-free feedstock material comprises, in wt. %:
    Ni: Balance
    C: about 1.08-about 1.32;
    Cr: about 13-about 22;
    Mo: about 10.8-about 13.2; and
    Nb: about 5.4-about 6.6.

5. The apparatus of claim 1, wherein the Cobalt-free matrix of the hardened layer comprises a Nickel matrix comprising:
    hard phases of 1,000 Vickers hardness or greater totaling 5 mol. % or greater;
    20 wt. % or greater of a combined total of Chromium and Molybdenum;
    isolated hypereutectic hard phases totaling to 50 mol. % or more of a total hard phase fraction;
    a $WC/Cr_3C_2$ ratio of 0.33 to 3;
    an ASTM G65A abrasion loss of less than 250 $mm^3$; and
    a Vickers hardness of 650 or greater.

6. The apparatus of claim 1, wherein the hardened layer has a Vickers hardness of 750 or greater.

7. The apparatus of claim 1, wherein the hardened layer has a porosity of 0.5 volume % or less.

8. The apparatus of claim 1, wherein the hardened layer has a corrosion rate of 1 mpy or less in a 28% $CaCl_2$) electrolyte, pH=9.5 environment.

9. The apparatus of claim 5, wherein the hardened layer has a corrosion rate that is less than 0.1 mpy in a 3.5% sodium chloride solution for 16 hours according to ASTM G59/ASTM G61.

10. The apparatus of claim 5, wherein the Nickel matrix has a matrix proximity of 80% or greater as compared to a corrosion-resistant alloy defined by Ni: BAL, X>20 wt. %, wherein X represents at least one of Cu, Cr, or Mo.

11. The apparatus of claim 10, wherein the corrosion-resistant alloy comprises an alloy having simple formula Ni30Cu.

12. The apparatus of claim 1, wherein the hardened layer is a component of a hydraulic cylinder, tension riser, mud motor rotor, or oilfield component application.

13. The apparatus of claim 1, wherein the Cobalt-free matrix forms a corrosion-resistant matrix, and under thermodynamic equilibrium conditions, the corrosion-resistant matrix has:
    hard phases totaling 50 mol. % or greater; and
    a liquidus temperature of 1550 K or lower.

14. The apparatus of claim 1, wherein the Cobalt-free feedstock material comprises a blend of an alloy having simple formula Ni30Cu, and at least one of WC or $Cr_3C_2$.

15. The apparatus of claim 1, wherein the Cobalt-free feedstock material is selected from the group consisting of, by wt.:
    75-85% WC+15-25% Nickel-Copper alloy;
    65-75% WC+25-35% Nickel-Copper alloy;
    60-75% WC+25-40% Nickel-Copper alloy;
    75-85% $Cr_3C_2$+15-25% Nickel-Copper alloy;
    65-75% $Cr_3C_2$+25-35% Nickel-Copper alloy;
    60-75% $Cr_3C_2$+25-40% Nickel-Copper alloy;
    75-85% $WC/Cr_3C_2$+15-25% Nickel-Copper alloy;
    65-75% $WC/Cr_3C_2$+25-35% Nickel-Copper alloy; and
    60-75% $WC/Cr_3C_2$+25-40% Nickel-Copper alloy;
    where the Nickel-Copper alloy is an alloy having simple formula Ni30Cu.

16. The apparatus of claim 13, wherein a $WC/Cr_3C_2$ ratio of the corrosion-resistant matrix is 0.2 to 5 by volume.

17. The apparatus of claim 1, wherein the hardened layer comprises:
    an ASTM G65A abrasion loss of less than 250 $mm^3$; and
    two cracks or fewer per square inch when forming the hardened layer from a PTA or laser cladding process.

18. The apparatus of claim 17, wherein the hardened layer comprises an impermeable HVOF coating which exhibits a corrosion rate of 1 mpy or less in a 28% $CaCl_2$) electrolyte, pH=9.5 environment.

19. The apparatus of claim 18, wherein the hardened layer further comprises:
    a Vickers hardness of 650 or greater; and
    an adhesion of 9,000 psi or greater when forming the hardened layer from a HVOF thermal spray process.

20. The apparatus of claim 17, wherein the hardened layer comprises:

a Vickers hardness of 750 or greater; and a porosity of 0.5 volume % or less when forming the hardfacing layer from a HVOF thermal spray process.

21. The apparatus of claim 1, wherein the coating of diamond-like carbon has a thickness of up to 30 microns.

22. A method of manufacturing the apparatus of claim 1, the method comprising:

thermally spraying the tungsten carbide in the Cobalt-free feedstock to produce the hardened layer; and applying the friction-resistant coating of diamond-like carbon to the hardened layer.

23. The method of claim 22, further comprising applying a lubricant to the diamond-like layer.

24. The method of claim 22, wherein the Cobalt-free feedstock is at least one of nickel feedstock, copper feedstock, and nickel-copper feedstock.

25. The method of claim 22, wherein the coating of diamond-like carbon has a thickness of up to 30 microns.

* * * * *